United States Patent [19]

O'Brien, deceased et al.

[11] 4,057,688

[45] Nov. 8, 1977

[54] INTERCOM EMBODYING TAP TRANSDUCERS

[76] Inventors: Gerard J. O'Brien, deceased, late of Jersey City, N.J.; by Catherine H. O'Brien, executrix, 33 Pamrapo Ave., Jersey City, N.J. 07305

[21] Appl. No.: 648,565

[22] Filed: Jan. 12, 1976

Related U.S. Application Data

[63] Continuation-in-part of Ser. No. 396,758, Sept. 13, 1973, Pat. No. 3,932,711.

[51] Int. Cl.² ............................................. H04M 9/02
[52] U.S. Cl. .................... 179/1 H; 179/1 R; 179/81 R; 179/84 T; 179/158 R
[58] Field of Search ................ 179/1 R, 84 T, 158, 179/1 H, 37, 81 R

[56] References Cited

U.S. PATENT DOCUMENTS

| 291,312 | 1/1884 | Drawbaugh | 179/142 |
|---|---|---|---|
| 452,636 | 5/1891 | Fitzsimmons | 179/131 |
| 452,758 | 5/1891 | Muller | 179/131 |
| 978,695 | 12/1910 | Caughrean | 179/84 T |
| 995,849 | 6/1911 | Dunton | 179/84 T |

FOREIGN PATENT DOCUMENTS

| 8,329 of | 1887 | United Kingdom | 179/81 R |
|---|---|---|---|
| 14,788 of | 1902 | United Kingdom | 179/168 |

*Primary Examiner*—George G. Stellar
*Attorney, Agent, or Firm*—Lackenbach, Lilling & Siegel

[57] ABSTRACT

An intercom system having a pair of interconnected devices, each of which has a speaker, a tap transducer, a power source and switch means, so that when they are connected together electrically, each device may be used as a transmitter or as a received, with the tap transducer in each case forming part of an electrical circuit serving both to receive and transmit signalling and sound signals, such as voice or other speech sounds. A detection device is provided for insuring that the intercom operates in that orientation thereof which provides optimum operating characteristics.

15 Claims, 36 Drawing Figures

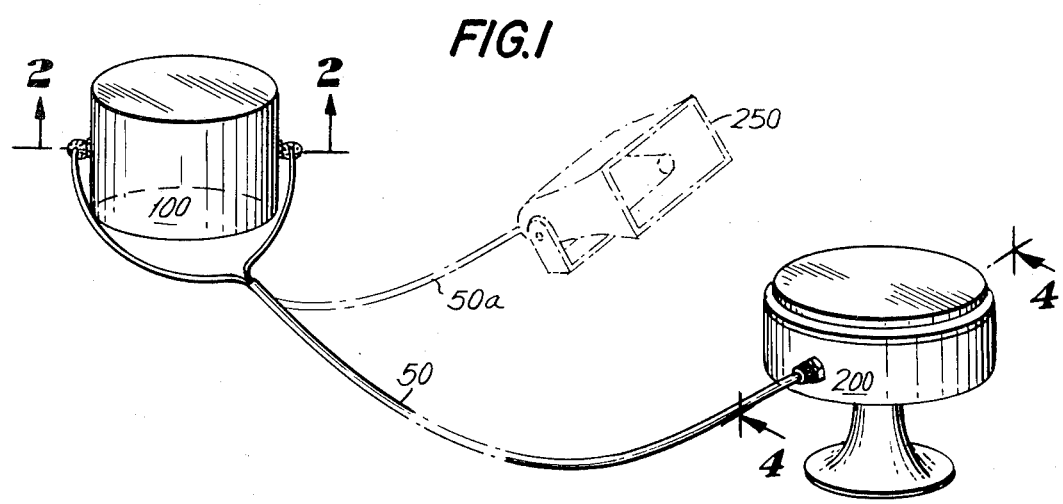
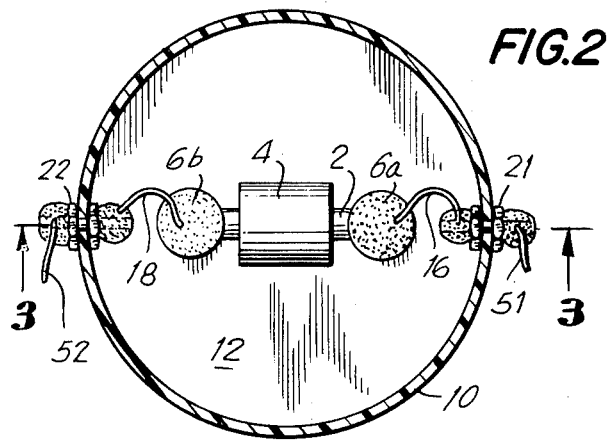
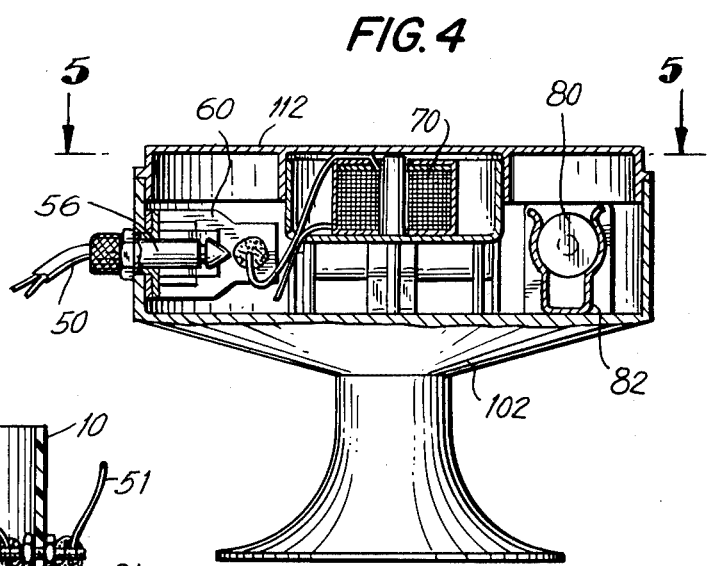
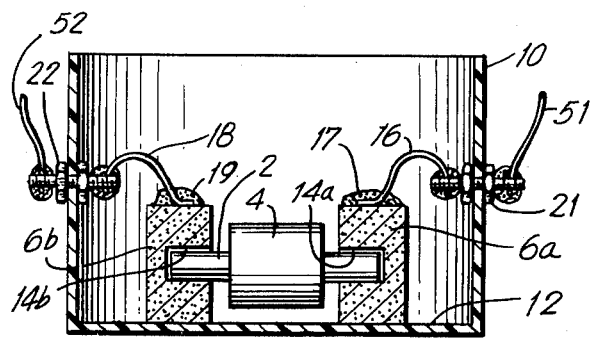

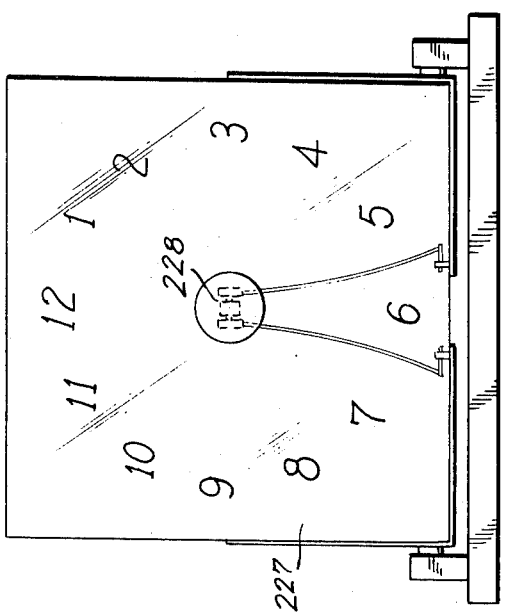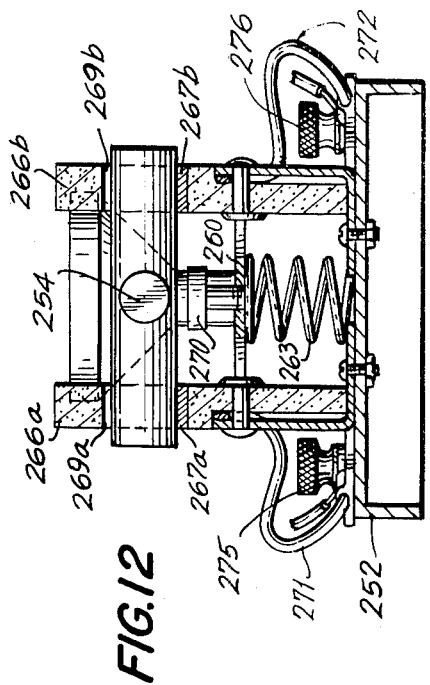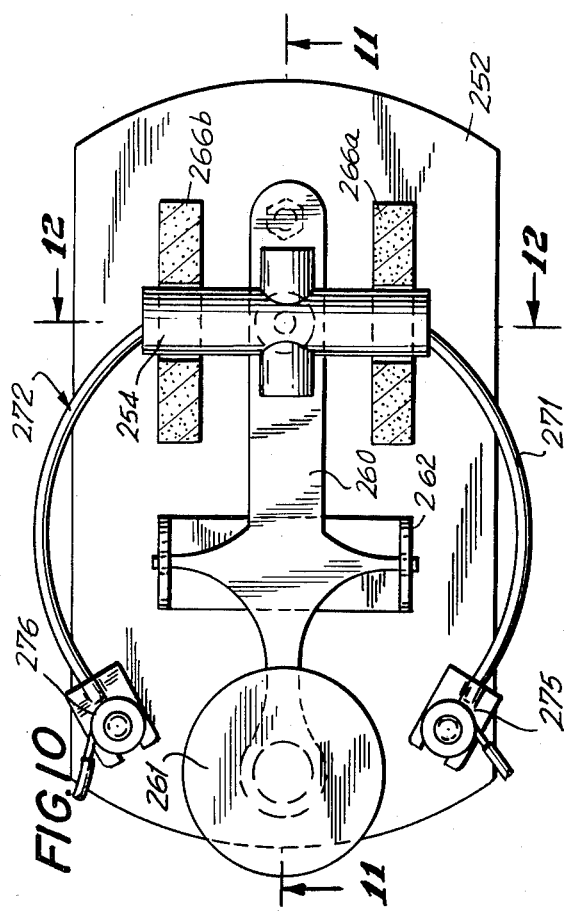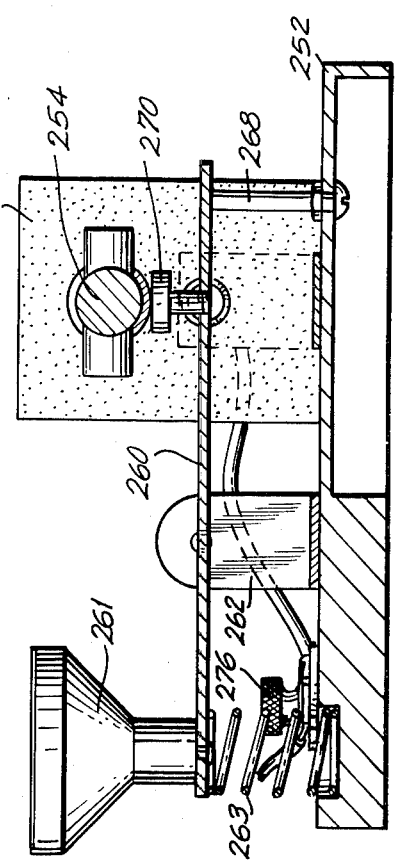

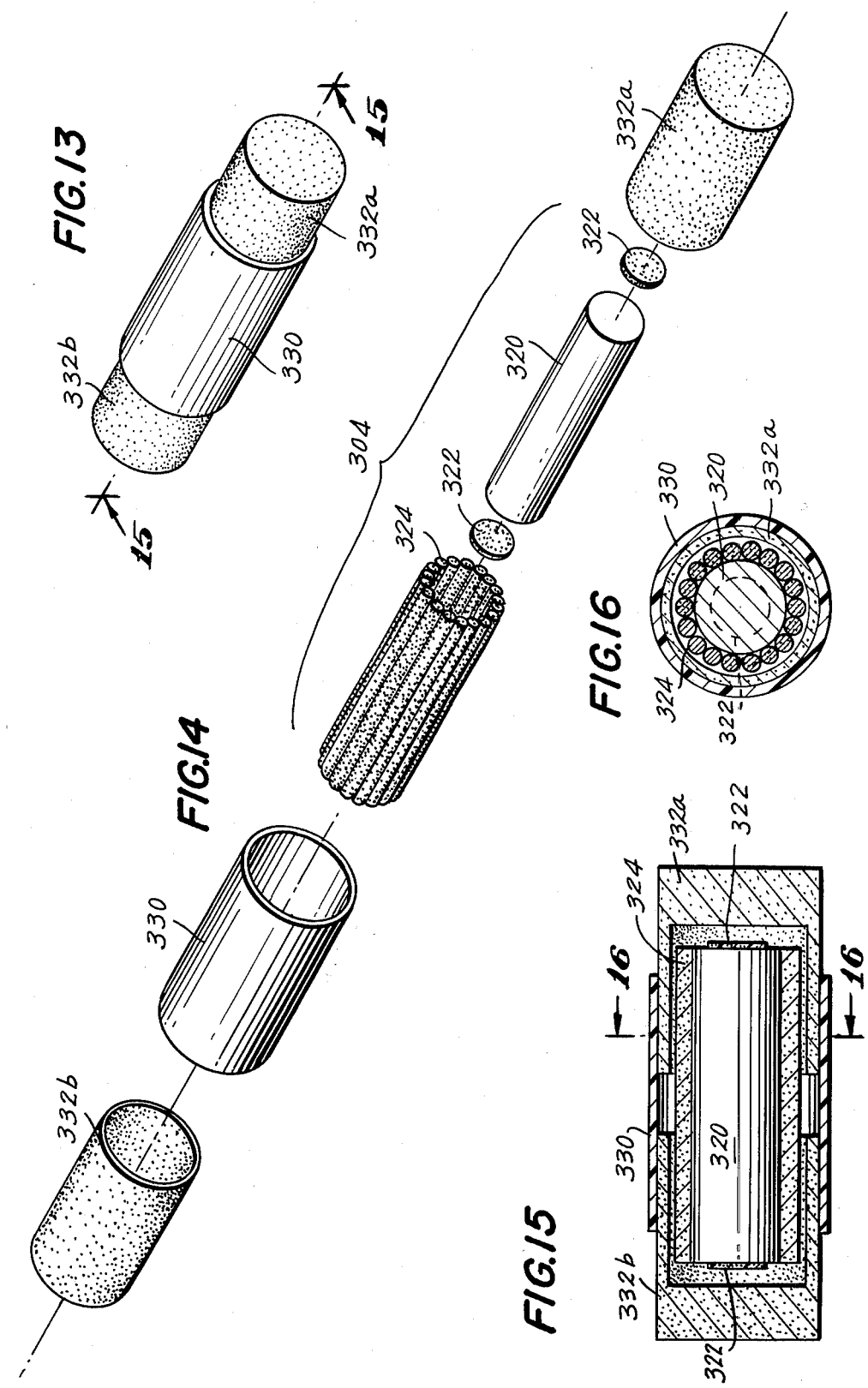

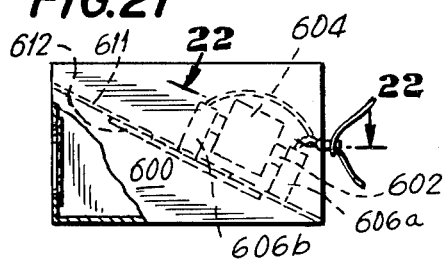
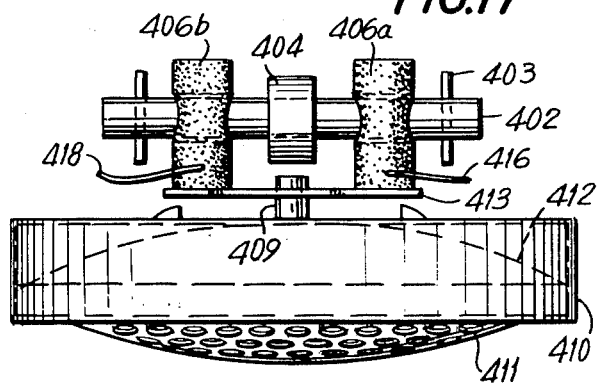
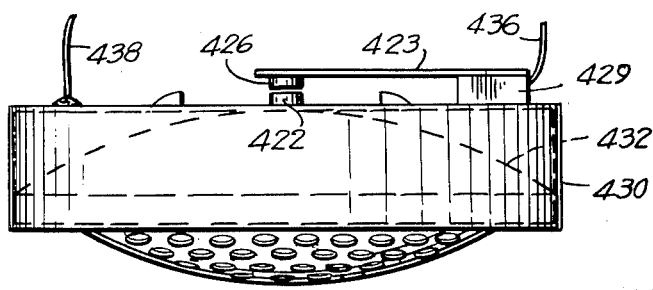
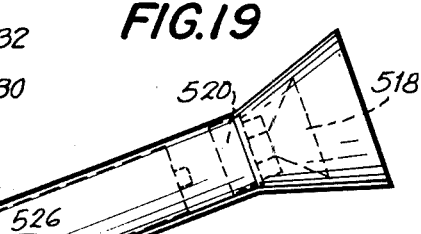
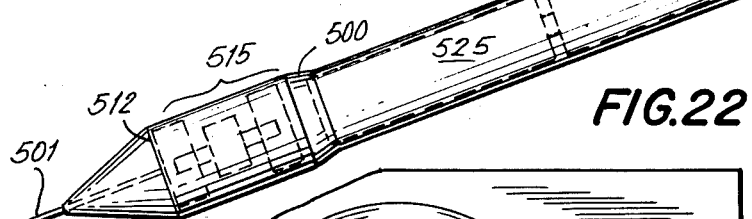
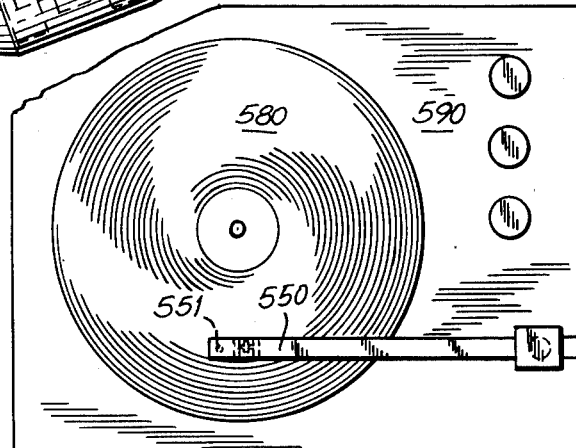
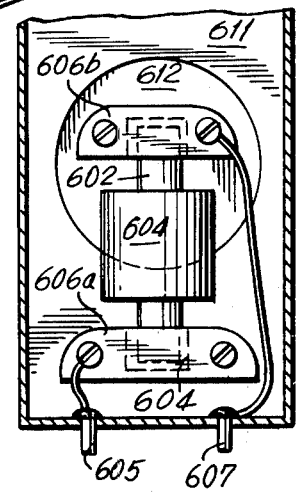
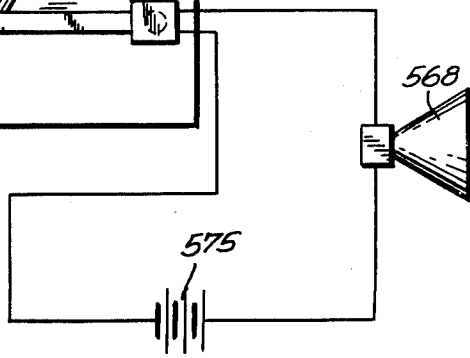

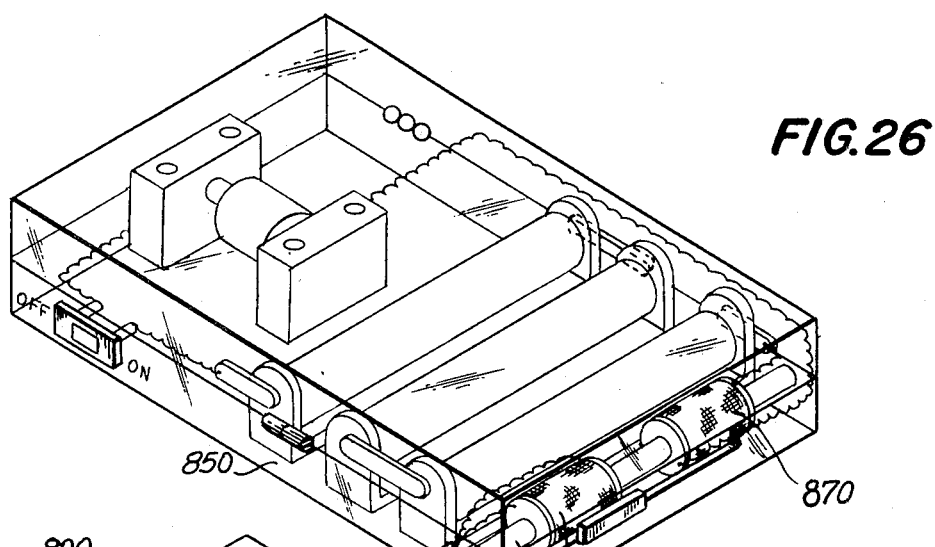
FIG.26
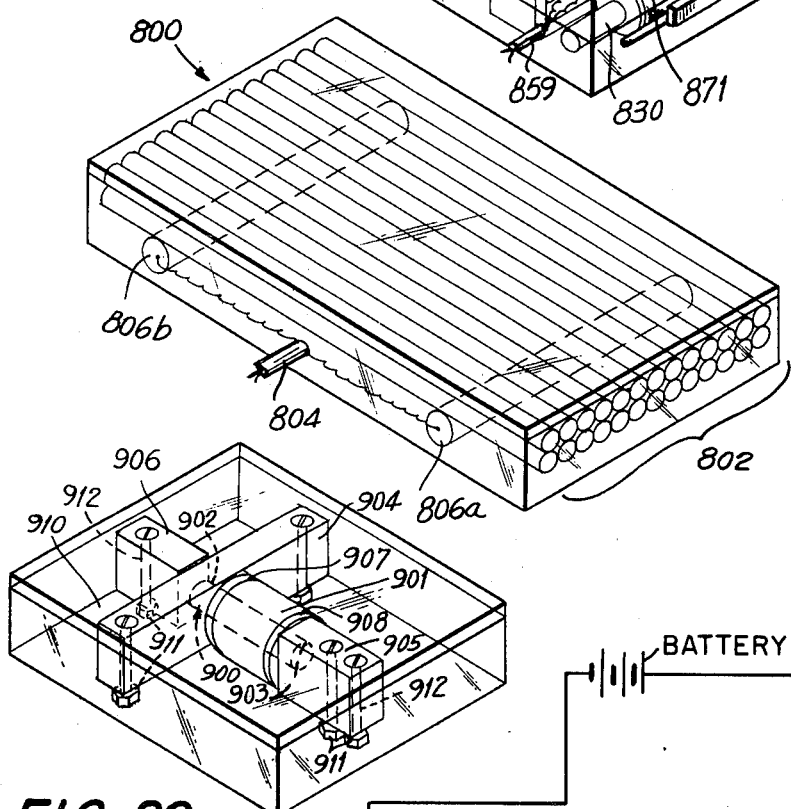
FIG.27
FIG.29
FIG.28
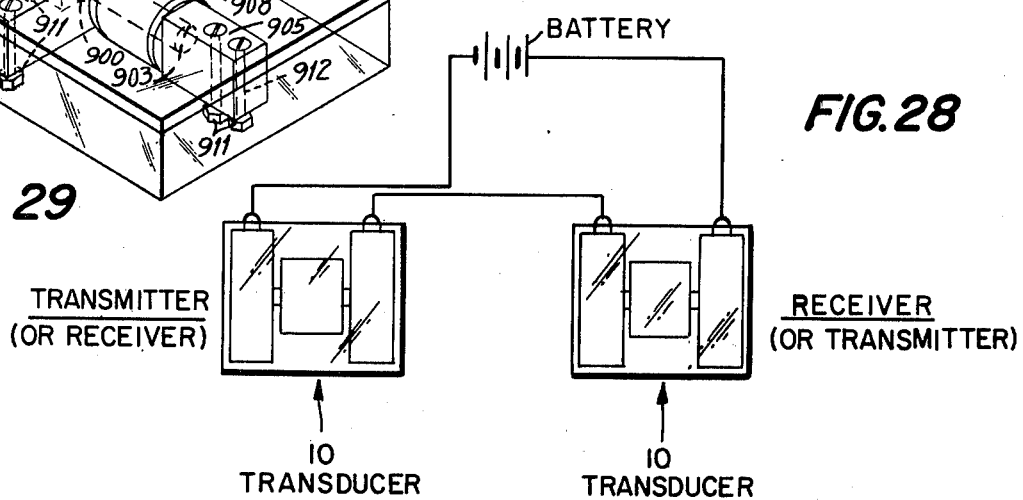

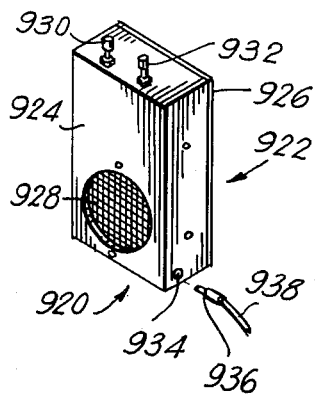
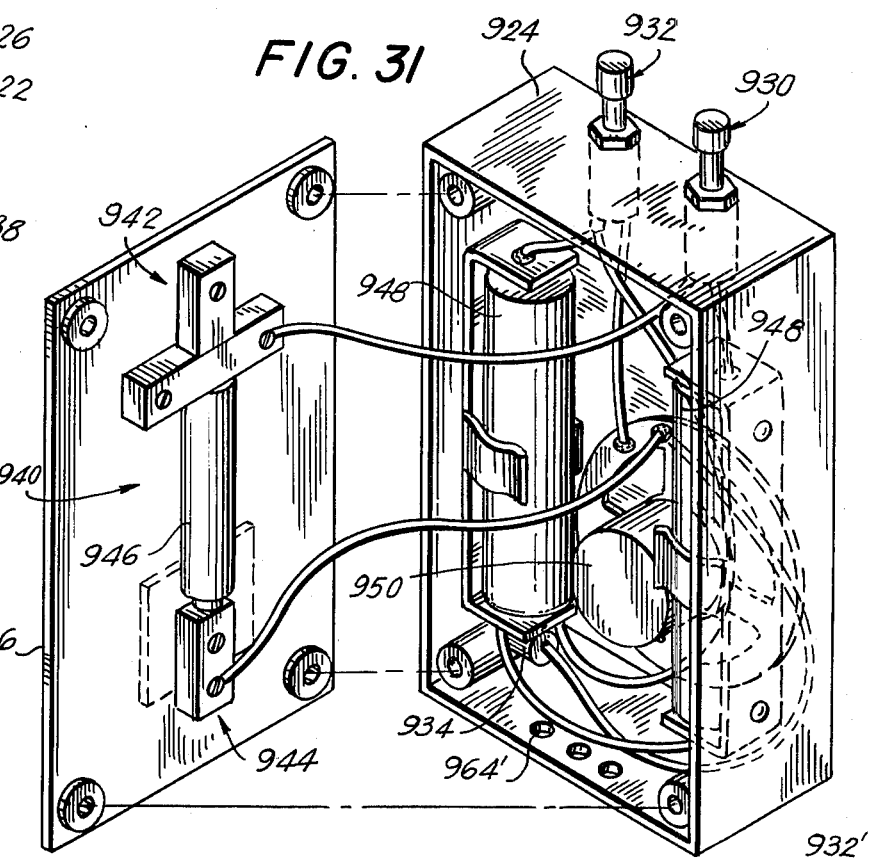
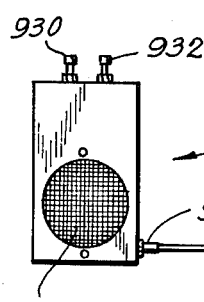
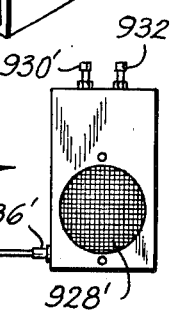
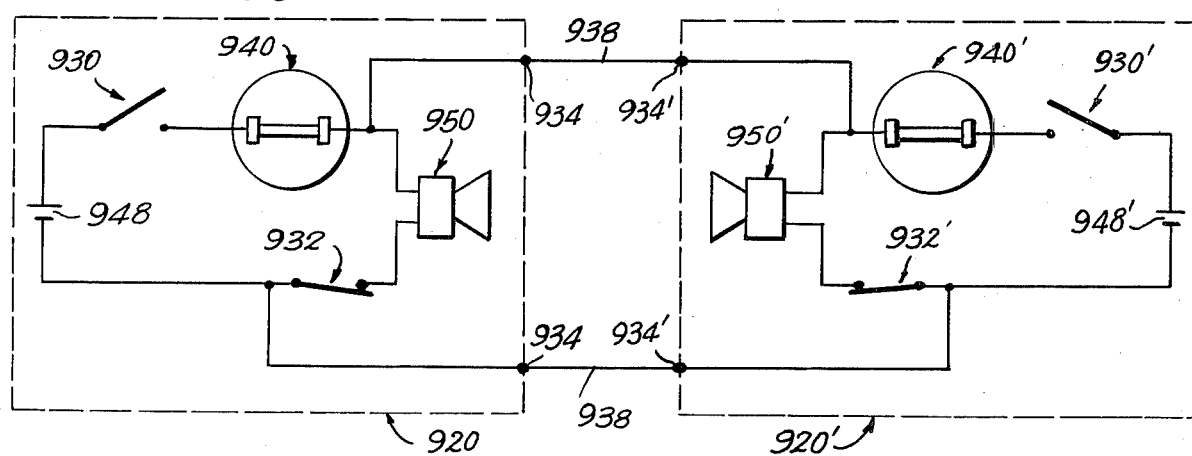

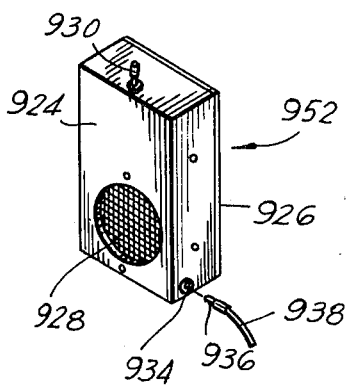
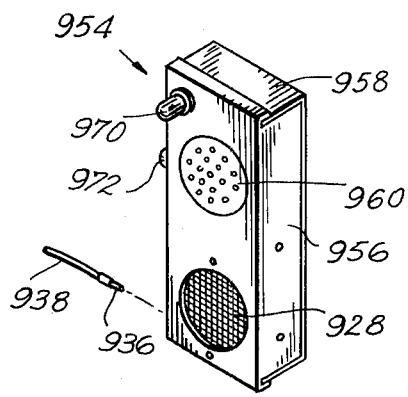
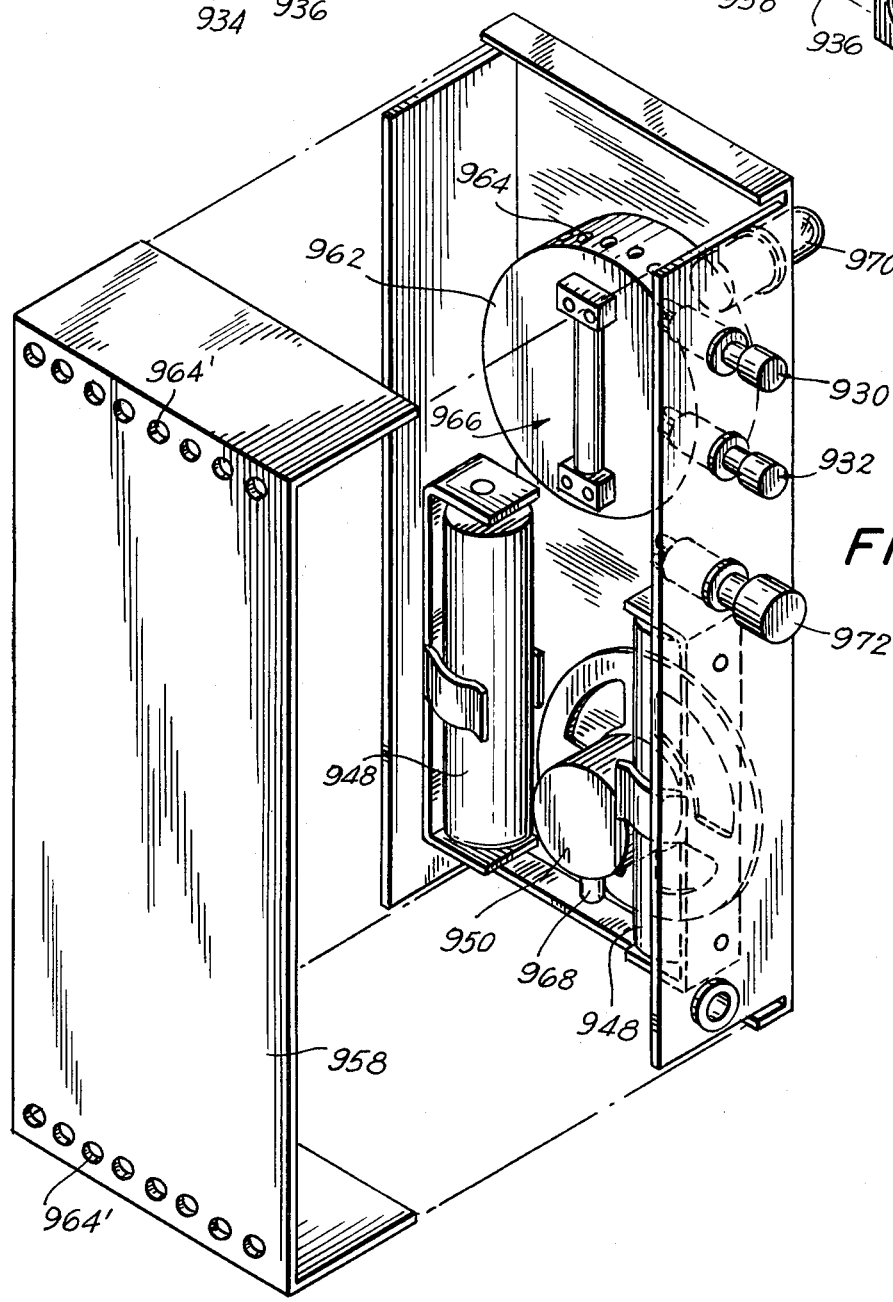

INTERCOM EMBODYING TAP TRANSDUCERS

CROSS REFERENCE TO RELATED APPLICATION

This application is a continuation-in-part application of application Ser. No. 396,758, filed on Sept. 13, 1973 and entitled: TRANSMISSION OF VOICE OR SOUND THROUGH TELEGRAPHY, now U.S. Pat. No. 3,932,711 dated Jan. 13, 1976.

BACKGROUND OF THE INVENTION

The invention accordingly relates generally to voice transmission systems in which the pressure fluctuations induced by speech are first converted to an electrical signal by a transducer, transmitted through a pair of wires and resolved into audible sound by means of a solenoid—through which the transmitted electrical signal is caused to pass–acting upon a flexible membrane.

The invention relates more particularly to devices in which the transmitted signal is a train of pulses of similar amplitude.

Sound transmitting devices of the prior art do not, in general, operate in this manner. Most commonly the transmitted signal corresponding to a continuously varying sound input is an analogous, continuously varying voltage.

Where transmission occurs in a pulsating current—as in Pulse Code Modulated telephone transmission—the receiver and speaker still operate on continuously varying signals, the PCM encoder and decoder being interposed between the ultimate terminals.

It is a primary object of the invention to provide a voice-grade transmission system in which the sound input is converted directly into a pulsed current, transmitted as such through a pair of wires, and resolved into coherent speech at the receiver.

It is a further object of the invention to provide a transmission system requiring no electronic components and operating entirely in a telegraphic mode from a direct-current power source.

It is yet another object of the invention to provide a telegraphic voice transmission system of relative structural simplicity, one which is economical to manufacture, reliable in operation and one which is easy to operate or use.

Yet a further object of the invention is to provide an intercom system employing tap transducers which convert voice or sound signals directly into a pulsed current for conversion at a receiver of electrical signals into coherent speech or other reproduced sound patterns.

SUMMARY OF THE INVENTION

The telegraphic voice transmission system of the instant invention employs a flexible soundboard, or membrane, as the detector of speech-induced pressure fluctuations in the air. A metastable, bouncing contact switch, hereinafter referred to as a "tap transducer", is mounted on the soundboard. The tap transducer preferably comprises a semi-conductive bar, such as a bar of graphite or carbon, suitably weighted and supported in a pair of bearing supports. The bar is provided with a loose fit in the bearing supports, to the extent where it is free to lift off the bearing surfaces but is prevented, by means of a separate retainer or other restraining or caging means where required, from completely disengaging therefrom.

When the soundboard vibrates under the influence of an imposed sound signal, the weighted bar of the tap transducer begins to bounce in its supports, alternately touching the bearing seats and losing contact with them. If a direct-current circuit is established across the bearing supports, which are electrically insulated from the soundboard, the bar will act as a switch and alternately make and break the circuit. The resulting signal is a train of pulses whose frequency of occurrence and duration is governed by the motion of the bar under the influence of the exciting speech signal.

With a loud-speaker coil series connected into the circuit, the pulsed voltage across its terminals will generate a motion in the speaker diaphragm closely corresponding to the motion of the transducer membrane and reproducing the same sound signal.

In the simplest form of construction, a membrane similar to the transmitting device membrane may be made subject to the influence of an electromagnet in the circuit and will serve as the output transducer of the transmission system.

Apart from its utility in the transmission of voice signals—in intercom systems, toys, telephones and the like—the tape transducer of the invention may also be used for other purposes; such as for noise and vibration detection, seismography, deflection sensing in balancing machines and many other industrial detector applications are possible.

The basic construction of the tap transducer and of the telegraphic voice transmission system will become apparent upon reading the following specifications and referring to the accompanying drawings of, which form a material part of this disclosure.

The invention accordingly consists in the features of construction, combination of elements, and arrangements of parts, which will be exemplified in the construction hereinafter described, and of which the scope will be indicated by the appended claims.

BRIEF DESCRIPTION OF THE ACCOMPANYING DRAWINGS

FIG. 1 is a top perspective view of the transmitting and receiving devices of the transmission system of the present invention with their interconnecting cable;

FIG. 2 is a cross-sectional view of the transmitter device taken generally along the line 2—2 of FIG. 1;

FIG. 3 is a transverse sectional view of the transmitter device, taken along the line 3—3 of FIG. 2;

FIG. 4 is a transverse sectional view of the receiving device shown in FIG. 1, taken along the line 4—4 thereof;

FIG. 9 is a frontal view of a tap transducer incorporated into a clock faceplate, converting same into a transmitter for use in the voice transmission system of the invention;

FIG. 10 is a plan view of a combination telegraphic sending device and voice signal transmitter;

FIG. 11 is a sectional view of the embodiment of FIG. 10, taken along the line 11—11 of FIG. 10;

FIG. 12 is a transverse sectional view, taken along the line 12—12 of FIG. 10;

FIG. 13 is a perspective view of a tubular tap transducer component adapted for use in the transmitting device of the invention;

FIG. 14 is an exploded view of the components of the embodiment of FIG. 13;

FIG. 15 is a transverse sectional view of the tubular tap transducer, taken along the line 15—15 of FIG. 13;

FIG. 16 is a transverse sectional view of the tap transducer of FIG. 13, taken along the line 16—16 of FIG. 15.

FIG. 17 is a side view of a further embodiment of the transmitting device of the invention;

FIG. 18 is a side view of a transmitting device employing a vibrating contact pair as tap transducer;

FIG. 19 is a side elevational view of a vibration detector, the inwards of which are shown in broken lines, which may be substituted for the transmitter of the telegraphic transmission system;

FIG. 20 is a schematic illustration of a record player utilizing a tap transducer in the pick-up arm;

FIG. 21 is a transverse sectional view of a transmitter with a laminated soundboard;

FIG. 22 is a sectional view of the embodiment of FIG. 21, taken along the line 22—22 thereof;

FIG. 26 is an isometric view of a transmitter of the invention provided with means for varying the intensity of the transmitted signal and adapted for use in conjunction with electronic signal amplifiers;

FIG. 27 is yet another transmitter of the invention, employing a planer array of switching bars in the tap transducer;

FIG. 28 is a schematic representation of an electrical circuit embodying a pair of tap transducer series connected in the circuit of FIG. 25 without the need of an electro-magnet;

FIG. 29 is a perspective view of another alternate embodiment of the transmitting and receiving device of the invention;

FIG. 30 is a front perspective view of an intercom device of the present invention;

FIG. 31 is another perspective view of the device of FIG. 30, but taken from the rear, with the rear panel removed therefrom so as to illustrate the interior of said intercom device;

FIG. 32 shows a pair of intercom devices electrically connected together by a suitable conduit cable having appropriate electrical jacks or the like at opposite ends for connecting said pair of devices electrically together;

FIG. 33 is an electrical schematic of a circuit showing the interconnection of two typical intercoms in accordance with the present invention;

FIG. 34 is a front perspective view of an alternate embodiment of an intercom device of the present invention.

FIG. 35 is a perspective view of the device of FIG. 34, but taken from the rear, with the rear panel removed therefrom so as to illustrate the interior of such modified intercom device; and FIG. 36 is another alternate or modified intercom device of the present invention.

DESCRIPTION OF THE PREFERRED EMBODIMENTS

Figure 5:
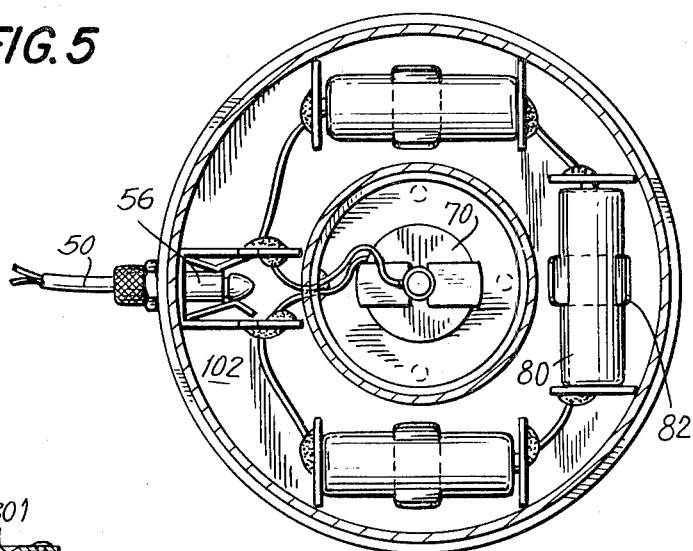
FIG. 5 is a cross-sectional view, of the receiver device taken along the line 5—5 of FIG. 4.

The telegraphic voice transmission system shown in FIG. 1 comprises a transmitter 100, a receiver 200, and an intermediate transmission cable 50. The receiver 200 may be replaced by a loud-speaker 250, such as a 25 watt speaker coil, connected to the transmitted 100 by a cable 50a, as shown in dotted outline.

As best shown in FIGS. 2 and 3, the transmitter 10 comprises a cylindrical cup-shaped housing 10 having a top surface or an integral membrane 12, serving simultaneously as the cover of the transmitter 100 and as the vibrating soundboard of the tap transducer. The housing 10 and the cover 12 are constructed from a rigid, non-conductive plastic material, permitting the direct mounting of a pair of bearing supports, 6a and 6b, to the latter. The bearing supports are suitably made of a carbonaceous material and are provided with blind bearing orifices 14 which support the ends of a shaft 2. The shaft 2 is also suitably made from a carbonaceous material and is provided with a very loose fit in the orifices 14. The shaft 2 is also suitably provided with a weight 4, preferably cylindrical in form midway along its span, which weight tending to hold the shaft 2 firmly against the bearing blocks.

Interconnection of the tap transducer—comprising membrane 12, bearing supports 6, and weighted shaft 2—with transmission cable 50 is through terminals 21 and 22, protruding through the wall of housing 10. The terminals are, in turn, connected to the bearing blocks 6 by means of wires 16 and 18; electrical and mechanical contact being ensured by glue beads 17 and 19, respectively.

The transmitter 100 may be used in a hand-held mode, or it may be placed upon a supporting surface, such as a table. The pressure fluctuations comprising the input sound signal set the membrane 12 into motion, entraining bearing supports 60 and causing the shaft 2 to oscillate in the cavity formed by the oversize bearing orifices 14, thereby intermittently interrupting the electrical path between terminals 21 and 22.

The frequency response of the tap transducer is governed by the vibratory characteristics of the membrane 12 and the mass of the shaft 2, with its integral weight 4. Experiments have demonstrated that satisfactory transmission of speech signals can be achieved within a wide range of membrane size and material. Typical dimensions are between 2 and 6 inches and materials range from steel to hard plastics; an equally wide range of shaft mass may be employed, typical weights lie between 1/10th of an ounce and 1 ounce.

It should be noted that the rod or bar element of the tap transducer of the invention may be of metal, such as ferrite or a carbonaceous material or other semi-conductor. However, a metallic rod generates more frictional resistance causing greater noise levels; whereas a semi-conducting material, such as carbon and graphite, substantially reduces friction and noise. A metallic element generally will generate a louder signal inasmuch as its conductivity is higher than that of a semiconductor. Thus, carbonaceous material suppresses noise which may be induced by varying contact pressure between the shaft 2 and the bearing slate 14, and it is recognized that since the nature of such material tends to provide clean output signals they are more preferred.

Figure 25:
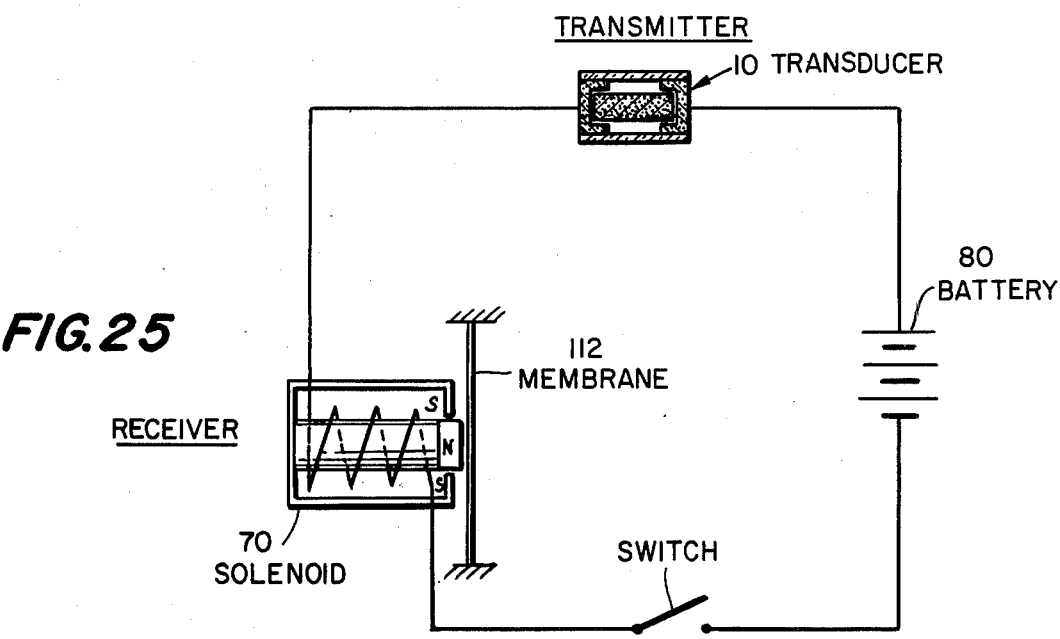
FIG. 25 is a schematic representation of the electrical circuit of the transmission system of the invention.

The receiving device 200, of the telegraphic voice transmission system of FIG. 1, is shown in detail in FIGS. 4 and 5. The cable terminates in a jack 56 and is inserted into a socket 60 through which the electrical circuit of the transmitter, more fully described with reference to FIG. 25, is completed. A cylindrical housing 102 is capped by a membrane 112 whose motion generates the reconstituted sound signal; the membrane 112 is driven by a solenoid coil 70 whose poles, when the coil is energized, exert a magnetic force upon the membrane, whose material is ferromagnetic in nature. The housing 102 also serves as the container of the direct current power supply for the transmission system; it consists of three dry-cell batteries 80, held in clips or suitable cradle clamps 82. The circuit elements are connected in series so that, when no signal is received at the soundboard of the transmitter 100 and the shaft 2 is resting in its bearing supports 6, a current flows through the solenoid 70 and attracts the membrane 112 toward the solenoid poles. Whenever the motion of input membrane 12 forces the shaft 2 out of contact with its supports, the circuit is broken and the attractive force of the output membrane 112 is removed. The vibratory motion of the membrane 112 as it is pulled toward the solenoid and then relaxed from its strained condition reproduces the motion of the input membrane 12 and, consequently, recreates the sound patterns reaching the latter. The electrical schematic of FIG. 25 represents the devices shown in FIGS. 3 and 4 and shows these to be in series connection with the battery and suitable switch means.

It will be appreciated as noted herinbefore, a battery-powered loud-speaker 250 may be substituted for the receiver 200, as shown in FIG. 1.

Figure 6:
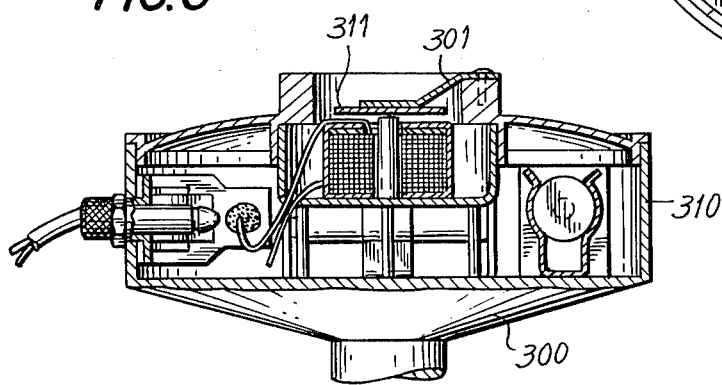
FIG. 6 is a transverse sectional view of an alternate receiver, particularly adapted to the reception of Morse-code.

A conventional telegraphic clapper receiver 300, as best shown in FIG. 6, may also be substituted for the receiving device 200. The output element of the receiver 300 is an iron disk 311, cantilevered on a spring 301 from housing 310. The receiver 300 may be used for Mores-code signals, or in applications where the transmitter 100 serves as a vibration detector; its frequency response is, generally, not adequate for the reproduction of voice signals.

Figure 7:
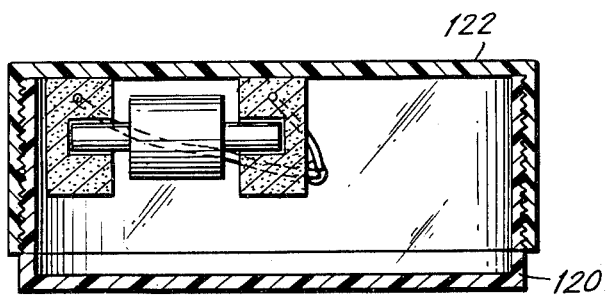
FIG. 7 is a transverse sectional view of an alternate embodiment of a transmitting device of the invention.

Another embodiment of the transmitter 100 is illustrated in FIG. 7. Two cylindrical cups 120 and 122 are suitably joined, such as by means of mating threads at their peripheries. The base of cup 122 serves as the signal acceptance membrane and has the tap transducer secured to its inner surface.

Figure 8:
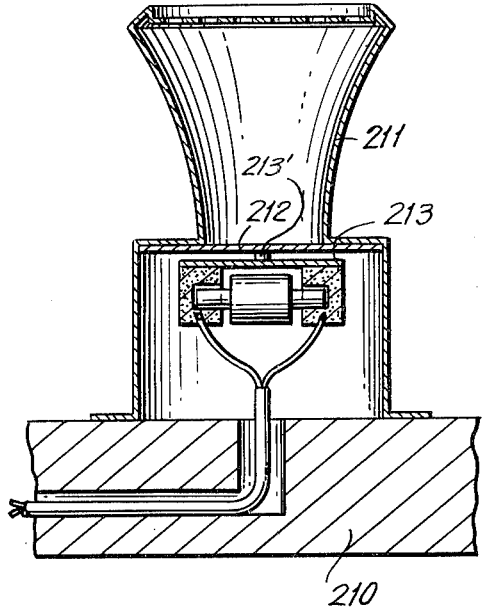
FIG. 8 is another transverse sectional view of an embodiment of the transmitter of the invention, provided with a directionally sensitive mouthpiece.

FIG. 8 shows yet another transmitter, distinguished by a voice-cone 211 above its membrane 212; the tap transducer is in this particular application suspended from the latter on a mounting plate 213 by means of a single reference joint 213. The voice-cone 211 serves, simultaneously, to increase the acoustic energy reaching the membrane 212 and to attenuate sounds originating away from its axis.

Since any sounding board may serve as part of a tap transducer assembly, the transmitter of the system may be incorporated into a number of devices commonly employed for other purposes. A device of this type is illustrated in FIG. 9; a tap transducer 228 is mounted against the face plate 227 of a free-standing clock (illustrated with the clock hands). The plastic face plate acts as the driving membrane for the tap transducer 228, and converts the clock into an effective microphone—in an office intercom system, for example—when coupled to a receiver of the instant invention.

FIGS. 9, 10 and 11 show a transmitter incorporated into a conventional telegraph-key sending device, permitting its utilization for code and voice transmission at the operator's option.

A key 260, with its integral finger-button 261, is supported in cradle 262 on a plastic base 252. The base 252 also serves as the sounding board for a tap transducer comprising bearing supports 266a and 266b and a weighted graphite bar 254. A spring 263 is interposed between the key 260 and the base 252, near the button 261, to bias the far end of the key against an adjustable stop 268 affixed to the base 252. A cam 270 is also mounted on the upper surface of the key 260, between the bearing 266, and its elevation may be adjusted, by means of stop 268, so that it is just clear of the weighted bar 254. The electrical circuit is established by means of cables 271 and 272, connecting terminals 275 and 276 with the bearing supports 266a and 266b respectively. The bar 254 is a loose fit in orifices 269 in the bearing supports 266 and rests upon insulating inserts 267a and 267b at either end. Whenever the telegraph button 261 is depressed the cam 270 lifts the bar 254 from the insulating inserts 267 and brings it into contact with the bearing supports 266. The electrical circuit between terminals 275 and 276 is closed thereby and the circuit is powered by a DC source as in conventional telegraphy.

If the aforementioned telegraph circuit is modified to include a receiver of the telegraphic voice transmission system, suitably the embodiment illustrated in FIG. 5, the transmission of voice messages is made possible by the incorporation of a tap transducer into the telegraph key; inverting the key and using the base 252 as a mouthpiece permits the imposition of an acoustic driving signal on the circuit formed by the bearing supports 266 and the bar 254 and its reception and rebroadcast through the membrane 112.

FIGS. 13 through 16 show the detailed construction of a composite weighted carbon bar 304, adapted for use in a tap transducer suitable for incorporation into the telegraphic voice transmission system of the invention. The bar 304 consists of a large number of small carbon or graphite rods 324 arrayed around the periphery of a cylindrical weight 320. The weight 320 may be a conductor or an insulator, but in the former type of construction, insulating means such as non-conductive discs, or a pair of insulating drops, such as an adhesive or glue drops, suitably hardened to a mass 322 are applied at the ends of the weight 320 to prevent electrical contact with supports 332.

The supports 332a and 332b are analogous to the bearing supports described with reference to other embodiments of the tap transducer; that is, they are made from carbon, axially aligned by means of sleeve 330, and they entrap the weighted bar 304. The cup-like sections of the supports 332 form a cavity, in conjunction with the sleeve 330, in which the components of the bar 304 are a loose fit and in which they are free to bounce under the influence of vibratory excitation transmitted from a soundboard through a rigid structure gripping the outer surfaces of the supports 332.

In function the embodiment of FIG. 14 may be considered analogous to a large number of smaller tap transducers operating in parallel. Experience has shown that such multiple embodiments generally show better fidelity at the higher input frequencies, at the expense of output power. Increasing the mass, on the other hand, tends to improve fidelity at low frequencies, also at the expense of transmitted signal strength. Single-conductor transducers are strongly preferred for the transmission of ordinary conversation, a use in which a relatively narrow bandwith only is required.

FIG. 15 is a cross-section through the complete multiple-conductor tap transducer assembly, omitting only the cables which interconnect the supports 332 into the electrical circuit of the transmission system. It shows the composite bar 304 in motion, midway between the upper and lower boundaries of the cylindrical inner surfaces of the supports 332; in the absence of any input forces the bar would rest at the bottom of the support cavity.

FIG. 17 shows a transmitter adapted for incorporation into a hand-held instrument, analogous to a telephone receiver, in elevation. A cylindrical housing 410 supports a perforated guard 411 and a curved diaphram 412 and the apex of the diaphram 421 carries a standoff 409 and an insulating plate 413 on which bearing supports 406 are mounted. The bearing supports are suitably made from carbon and are provided with coaxial cylindrical orifices in which a bar 402, also suitably made of carbon, is entrapped by means of pins 403. A weight 404 ensures good surface contact between the exterior of the bar 402 and the orifices in which it is provided with a loose fit. Conductors 416 and 418, attached to bearing supports 406a and 406b respectively, complete the transmitter assembly.

A simplified transmitter is shown in FIG. 18, with the tap transducer incorporating a pair of contact buttons 422 and 426; the former on the vibrating surface of a diaphram 432 and the latter attached, view mounting block 429 and cantilever 423, to the housing 430. As the sound input forces the diaphram 432 to vibrate along its axis of symmetry, the contacts 422 and 426 alternately touch and separate, thereby interrupting a direct-current circuit established across them by means of leads 436 and 438.

A vibration detector based on the tap transducer of the invention is illustrated in FIG. 19. A substantially cylindrical housing 500 is provided with a conical nose from which a needle 501 protrudes. The needle 501 serves as the vibration pick-up when pressed against a body whose motion is to be monitored. The needle 501 is connected to a support 521 which transmits any vibration sensed by it to a tap transducer assembly 515, which, in turn, is incorporated into a DC circuit powered by batteries 525 and 526. A solenoid 520 is also in the circuit and drives a conical diaphram 518 in a flared-out portion of the housing 500. The intensity and pitch of the sound issuing from the diaphram 518 is a measure of the amplitude and frequency of the vibration experienced by the monitored body. Such an instrument is readily used to isolate the offending portions of complicated machinery in which some parts may be acting as noise sources; touching the several components will reveal which is active and which is not.

A similar device, acting as the pick-up for a record player 590, is illustrated in FIG. 20. A needle 551 is mounted orthogonal to an elongated tone-arm 550, and a tap transducer is mounted in the tone-arm near such needle and experiences motion in a vertical plane as the arm tracks over the groove in a record 580. The tap transducer is connected into an electrical circuit which includes a DC source 575 and a solenoid-driven speaker 568. In such a device, the tap transducer can be mounted anywhere along the length of the tone-arm or even be slidably disposed so as to be positioned where the best results are achieved. In this regard, the weight on the bar element may be adjustable so as to also achieve best results.

A tap-transducer, suitable for either vibration monitoring or the transmission of voice-grade signals, is shown in FIGS. 21 and 22. A rectangular sound-box 600 is divided into two compartments by a diagonal, composite membrane comprising superimposed sheets 611 and 612. The membrane 612 is made from an electrically insulating material. Membrane 611, which may be an insulator or a conductor, is provided with a circular cut-out where a bearing support 606b is mounted to sheet 612, and the other bearing support 606a is affixed to membrane 611. The two bearing supports 606 are provided with blind, coaxial orifices 609 facing one-another. A rod 602, held by a weight 604, is entrapped in the bearing orifices 609. The supports 606 are suitably constructed from graphite, the rod 602 is suitably brass. The two bearing supports 606 are connected to electrical terminals 605 and 607 to form a series circuit through the rod 602; and the circuit is interrupted every time the motion of the composite soundboard causes the rod to leave one or the other of the bearing seats formed by the orifices 609.

Figure 23:
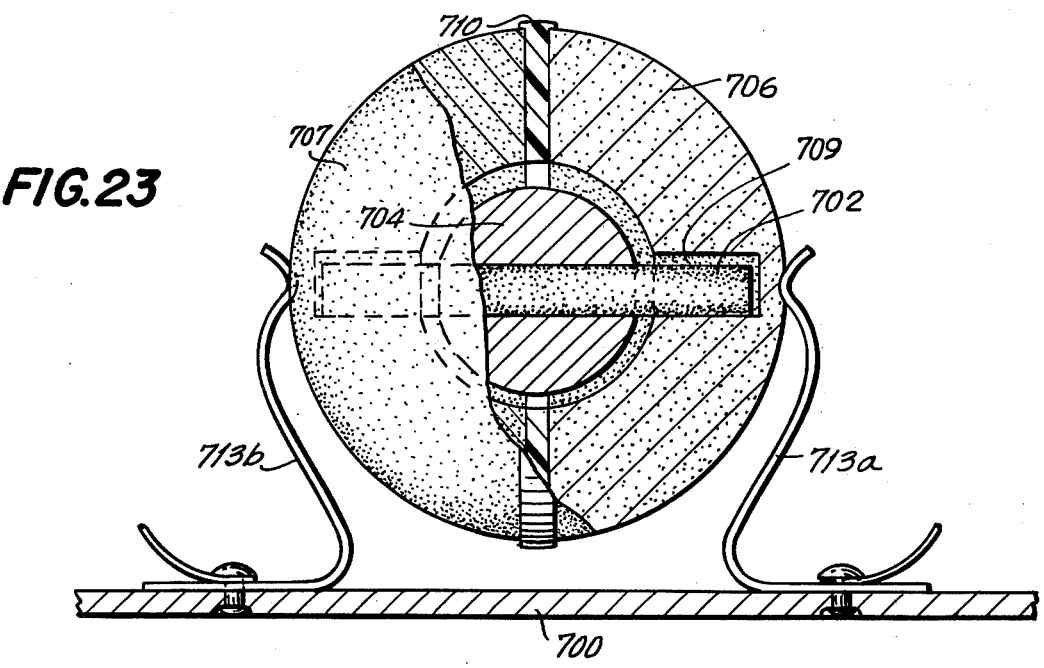
FIG. 23 is an end view, partially in section, of a tap transducer adapted for service in an industrial environment.

A form of tap transducer particularly adapted for use in industrial environments, where dust and liquid-tight construction is generally required, is shown in FIG. 23. In such construction, supports 706 and 707 are hemispherical bodies, suitably of carbon provided with hemispherical cavities on their inner surfaces and with blind orifices 709 along a path orthogonal to their plane of separation. The two supports form a completely enclosed sphere in conjunction with an interposed insulating washer 710 and they entrap a bar 702 which is a loose fit in the orifices 709. The bar 702 carries a spherical weight 704, somewhat smaller in diameter than the cavity formed by the supports 706 and 707. Two curved springs 713 engage the support halves and provide both the force required to keep the assembly intact, and sealed, and electrical contacts to the external circuit. The springs 713 are mounted on a base-plate 700 which is an insulator.

Figure 24:
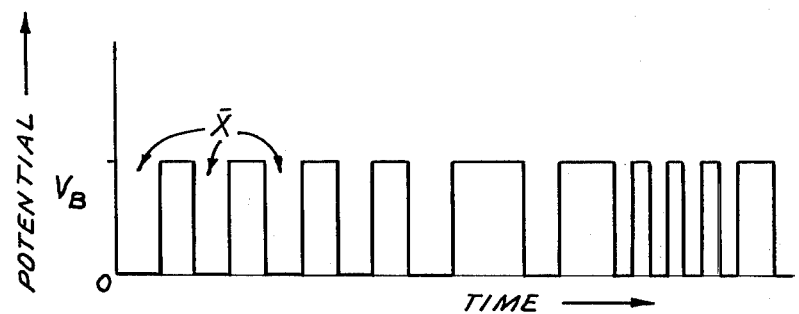
FIG. 24 is a graphical representation of the signal generated by the tap transducer of a telegraphic voice transmission system.

FIG. 24 is a simplified graph of a signal produced by a tap transducer when subjected to a vibratory input, and FIG. 25 is a schematic representation of the electrical circuit of the invention. The potential $V_B$ represents the voltage of the direct-current power source in the circuit, this potential is applied across the terminals of the receiving device—the solenoid coil 70 of FIG. 4, for example—whenever input excitation is absent. Should an upward force of sufficient magnitude be imposed on the bearing seat and the current flowing therethrough is interrupted, causing the potential at the receiver terminals to drop to zero—this condition is represented in FIG. 24 by the regions 'X'.

Having left the bearing seat, the bar of the tap transducer becomes independent of the vibratory input applied to the bearing supports and is only subject to the inertial loads previously transmitted to it and to the gravitational force of the earth. The bar will, therefore, after a lapse of time—the duration being dependent on the relative magnitude of the above forces—again seat itself on the bearing support, thereby re-establishing the circuit and causing the potential $V_B$ to appear once more, across the receiver terminals. The relative durations of the two states of the bar—on or off the supports—depends on the amplitude and frequency of the applied vibration, on the physical characteristics of the input membrane, and on the construction of the tap transducer itself.

In FIG. 28, there is illustrated in generally schematic form a D.C. circuit embodying a pair of tap transducers in series, which operate without the need of an electromagnetic coil. Thus, one tap transducer can be used to transmit a signal directly to another tap transducer, for signalling another or for speech transmission as with an intercom system, and in this connection, it has been noted that by increasing the D.C. power, the transmitted sound or signal becomes greater or louder.

FIG. 27 is another embodiment of a tap transducer utilizing a multiplicity of switching bars; in contrast to the cylindrical arrangement shown in FIG. 14, a planar configuration is used here. A rectangular plastic container 800 has a pair of support bars 806 placed transversely across its bottom; a large number of switching bars 802 is placed across the support bars in the manner of cordwood. A clearance space is provided between the upper surface of the stacked bars 802 and the cover of the container 800 to permit the motion of the switching bars; a utilized in the battery pack of the transmitting system, it would be possible to arrange for one, two, three, or more to be in the circuit at any given time—with corresponding influence on the intensity of the output signal at the receiver.

The telegraphic voice transmission system of the invention may also be used for the transmission of messages over long distances by the provision of independent circuits of such length as may be readily powered by an available D.C. source and arranging the output device—receiver—of one circuit to act as the input device—transmitter—of the next. Such arrangements are known in the telegraphic arts and may be readily mechanized in the devices of the invention by using the output membrane of one circuit in the chain as the input membrane of the next, that is by mounting a tap transducer on the upper surface of a horizontally arranged membrane driven by a solenoid coil.

It should also be appreciated that, for example, with the tap transducer of FIGS. 2 and 3, the cup-shaped housing may be partially filled with a liquid, such as water and one can speak directly into the liquid and one's voice is transmitted by the tap transducer.

It has also been observed in operating the tap transducer of the invention that during transmission of one's voice or sound, some "small particles or elements" of vibrations appear to be missed or skipped because of the speed of the voice or sound, and the uneven lengths of certain portions of the sound of the voice. It seems that the weighted bar of the tap transducer, while making and breaking contact at a very high rate cable 809 provides electrical connection to the transverse support bars 806a and 806b.

FIG. 26 shows an embodiment of the transmitter of the instant invention particularly adapted to be connected to an electronic amplifier. The circuits heretofore described are not adapted to such use since the essentially direct current nature of their output signal cannot be amplified by conventional electronic devices. A tap transducer is shown mounted in a container 850, along with a number of batteries connected in series, an on-off switch and a modulator assembly. The latter is essentially an isolation transformer with a central core 830, a receiving solenoid 870 and an output coil 871.

The output coil and the receiving solenoid are similar in construction but the coil 871 is slideably arranged on the core 830 so that its distance, and hence the magnetic coupling, with respect to the solenoid 870 may be altered. The modulator assembly performs two functions simultaneously, it abstracts the average, or D.C. component of the signal generated at the tap transducer and it enables the user to reduce, or increase, the intensity of the output signal by moving the output coil 871 farther, or closer, to the fixed solenoid 870.

Another method of modulating the signal intensity in discrete steps, but not continuously as in the embodiment of FIG. 26, is by providing a multiple-pole switch in the transmission system circuit in such a manner that one or more batteries may be removed from the series circuit of the direct-current power source. If, for example, 1.5 volt batteries were of speed, misses certain particles or elements of vibration, and this occurs more so from direct speed or voice applied against the diaphragm of the tap transducer, than from pumps, motors, etc. which deliver an even, uninterrupted continuous sound where generally no such "misses" occur. However, such occurrences do not effect the operation of the invention, and rather only appear to render one's voice more hoarse sounding, as for example when one's speech is uneven in volume or loudness. Furthermore, such "misses" are only barely "detected" in the case of an ordinary speaker when it is pointed directly at a party; but when a horn type speaker is used, and is turned away from the party the natural echo of the room automatically overcomes the missing particles or elements, and the voice is received or heard loud and clear. The receiver placed against one's ear also receives the signal or voice loud and clear inasmuch as the ear piece has a metallic diaphragm which "slurs" all particles of the voice into one even sound, and therefor the missing particles or elements are not noticed or detected at all from the ear piece.

With reference to an embodiment of the invention involving a pair of tap transducers mounted in different positions on one diaphram (not shown), some acts as a single tap transducer, but such apparatus also slightly broadens the voice. Also, with a plurality of tap transducers on one line, a number of parties may speak at the same time, and all of the voices are received loud and clear on a horn type loudspeaker.

In FIG. 29, an alternate embodiment of the invention is illustrated. As shown therein, a shaft 900 is provided with a suitable weight or member fixedly secured thereto, such as a metallic cylinder 901. The shaft 900 is suitably mounted in a pair of passage means 902, 903 provided, respectively, in end blocks 904 and 905. Block 906 simply reinforces block 904 by "bearing" against same and exterting a slight "touching pressure", thus cutting down on the amount of vibration generated and aiding to eliminate any tendency for the device to over vibrate. Such a structure in the form of a "cross" provides for the delivery of a smoother sound without the need for adding an additional weight to the bar or shaft 900.

Suitable insulating means 907 and 908 are provided between the weight 901 and the end blocks 904 and 905, respectively. The device is also suitably spaced from the diaphram 910 by means of spacers 911 disposed about the fastening means 912 holding the device to the diaphragm 910 in order to allow the weight to freely move or vibrate in its bearing support blocks 904 and 905. In fact with the device as shown, the cylinder 901 is free to rotate with the shaft 900 and such rotation can be used in an intercom device of the invention to signal a receiver since the rotating shaft will generate a vibrating and ringing type of noise at the receiver. Accordingly, with a freely spinning or rotating shaft, one can "ring" another in an intercom system by spinning the shaft and weight without the need for any special bell elements as the device itself will serve both functions to alert the receiver side of the intercom as well as permit the transmission of voice or sound through such telegraphic principles.

Intercoms incorporating tap transducers of the type above considered will now be described in connection with FIGS. 30–35. One such intercom is shown in FIGS. 30–33 and is designated by the reference numeral 920.

Referring first to FIGS. 30–32, the intercom 920 generally includes a rectangular housing or chassis 922 including a rectangular enclosure 924, the interior of which becomes accessible by removal of a cover 926.

On the wall of the rectangular enclosure facing away from cover 926 there is provided an opening which is covered by a speaker grill 928.

On the top of the rectangular enclosure 924, as viewed in the figures, there are provided two push buttons 930 and 932, which are to be more fully described hereafter, which buttons are positioned on the housing 922 so that each of the buttons can be conveniently and selectively depressed. When positioned as shown, the button 930 can be conveniently depressed with the use's middle finger while the button 932 can be depressed by the user's pointing finger.

There is also provided on the housing 922 output female terminal connectors 934 which are adapted to be mated with a male connector 936 which is electrically and mechanically connected to electrically conductive leads, wires or conductors 938 for transmitting electrical signals containing sound or speed information to a remote location, as to be more fully described in connection with FIG. 33.

Referring primarily to FIG. 31, the intercom 920 is shown with the cover 926 removed from the rectangular housing 924 to show the interior of the intercom. In this embodiment, a tap transducer 940, of the type generally described above, is shown mounted on the cover 926 which acts as a soundboard sensitive to vibratory inputs. The tap transducer 940 includes a pair of spaced electrically conductive bearing supports 942 and 944 rigidly mounted on the soundboard or cover 926 and electrically insulated therefrom. As with the other tap transducers described above, the tap transducer 940 includes a conductive switching bar 946 which extends between and is loosely engaged in the bearing supports 942 and 944.

A source of electrical energy in the nature of batteries 938 is provided and suitably mounted within the rectangular enclosure 924 in any conventional manner. Additionally, the intercom 920 includes a loudspeaker 950 or other conversion means for converting electrical signals into audible sound or speech.

The intercom 920 is shown in its assembled and disassembled conditions in FIGS. 30 and 31 respectively. In FIG. 32, two similar intercoms at remote locations from one another are shown electrically interconnected and FIG. 33 represents the electrical schematic or wiring diagram of the pair of intercoms shown in FIG. 32. The two interconnected intercoms in FIGS. 32 and 33 being identical in construction, only one of the intercoms will be described in detail, it being understood that identical or similar parts in the other intercoms are designated by the same corresponding reference numerals primed, and the operation of the two intercoms is identical. The operation of the intercoms can best be described with reference to FIG. 33 and such description of the operation will now be given. The intercom 920 is generally in the form of a simple series circuit with one pole of the battery 948 being connected to one of the bearing supports of the tap transducer 940 through a normally open switch 930. The speaker 950 has two terminals, one of which is connected to the other of the bearing supports of the tap transducer 940 while the other input terminal of the speaker 950 is connected to the other pole of the battery 948 through a normally closed switch 932.

The switch 930 is in the nature of a power switch and serves as an actuation means for selectively enabling and disabling the operation of the intercom 920 since a current may flow through the series circuit only when the switch 930 is closed. When the conductive switching bar 946 is in contact with both bearing supports 942 and 944, a direct or constant current is permitted to flow through the series circuit including the tap transducer 940 and the speaker 950. However, this constant current is converted into electrical signals containing sound or speech information when the soundboard is exposed to the sound or speech and the current in the circuit is repeatedly interrupted to correspond to the vibratory characteristics of the sound or speech patterns due to the make and break conditions of the conductive switching bar with relation to the bearing supports 942 and 944. The resulting current assumes a wave shape similar to that shown in FIG. 24. When an electrical current is so modulated to contain sound or speech information, a suitable conversion means such as a speaker can convert these electrical signals into audible sound or speech. Accordingly, closure of the switch 930 and exposure of the soundboard 926 to sound or speech causes such sound or speech to be impressed upon the current in the circuit and the resulting current causes these very sound or speech signals to be reproduced by a speaker 950.

The output terminals 934 are connected to the intercom series circuit and the electrical signals which contain the sound or speech information are present at the output terminals 934. The output terminals 934 are adapted for mating with a corresponding or associated terminal connector 936 for transmitting the electrical signals to a remote location. In this manner, the electrical signals appearing at the output terminals 934 may be used to produce sound or speech at the location of the intercom 920 or to transmit the same to a remote location of an intercom 920'.

While the switch 930 can be of any suitable type, including a single pole double throw switch, the switch 930 in the presently preferred embodiment is in the nature of a single pole momentary contact switch which actuates or enables the operation of the intercom 920 for purposes of transmitting information only when the switch is depressed. Such an arrangment shows that the circuit of the battery 948 is open during non-use to thereby prevent drainage of the battery and to prolong its life.

The intercom 920 has a further advantageous feature in that it may be caused to ring to alert a user at a remote location of impending transmission of speech or sound signals. In order to achieve such ringing, the speaker 950 is mounted on the housing 922 proximate to the soundboard 926 to acoustically couple the loudspeaker 950 and the conductive switching bar 946. In the intercom 920, the soundboard 926 is adjacent to and directly in back of the speaker 950 to thereby provide substantial accoustic coupling. In this manner, the speaker 950 reinforces the mechanical vibrations of the soundboard when the current is applied to the loudspeaker. This accoustic coupling is in the nature of a feedback which progressively increases the magnitude of the mechanical vibrations of the conductive switching bar 946 and the ringing emitted by the loudspeaker 950 once the ringing mechanism is set into effect by the slightest movements of the conductive switching bar 946 which initiates the making and breaking of electrical contact with one or both bearing supports 942 and 944. The ringing mechanism may also be initially started by the very closure of the switch 930 which applies an instantaneous current to the speaker 950 which instantaneous increase in current may be sufficient to disturb the air within the housing 922 and thereby move the soundboard 926 to disturb the stationary condition of the conductive switching bar 946.

As described above in connection with the tap transducers in accordance with the present invention, each of these tap transducers has a conductive switching bar which defines an axis. Sufficient clearance is provided between the conductive switching bar 946 and the bearing supports 942 and 944 to permit movement of of the conductive switching bar 946 in directions transverse to the axis thereof to provide the necessary make and break conditions which repeatedly interrupt the current flowing through the intercom circuit. This characteristic of the tap transducer 940 or the ability to make and break the circuit of the intercom rapidly and repeatedly to correspond to the vibratory characteristics of the sound or speech patterns is important not only for generating the necessary electrical signals which carry speech or sound information to remote locations, but is also important for the achievement of the ringing function above described. As will be evident to one skilled in the art, the switching bar 946 is least mechanically stable or is in a state of least equilibrium when the axis of the switching bar 946 is in a substantially vertical orientation. It is when the conductive switching bar 946 is vertically disposed as shown in FIG. 31 that the tap transducer 940 provides optimum vibratory or switching characteristics. When the conductive switching bar 946 is disposed in a substantially horizontal position, the weight of the switching bar 946 impedes its transverse movements and therefore limits the amount of switching which can be achieved. For this reason, the tap transducer 940 is mounted on the housing 922 so that the axis of the conductive switching bar 946 is generally or substantially in a general orientation as shown.

With the circuit of the transducer 920 as described above, closure of the switch 930, with the switch 932 closed, produces an audible ringing sound as a result of the mechanical vibrations of the conductive switching bar 946 due to the accoustic feedback between the transducer 940 and the speaker 950. In order to eliminate the ringing at the user's or initiator's location, the switch 932 may be opened simultaneously with the closing of the switch 930 to disable the speaker 950. However, when two intercoms 920 and 920' are interconnected as shown in FIG. 33, the speakers 950 and 950' are connected in parallel to each other so that the speaker 950' continues to be receptive to the electrical signals generated in the intercom 920 even though the speaker 950 has been disabled or removed from the circuit by the opening of the switch 932.

To relay the intercom 920' from the intercom 920, only the switch 930 is initially depressed. The switch 932 is maintained in its normal closed position to maintain the speaker 950 in the circuit of the intercom 920 to provide the required accoustic feedback or coupling between the transducer 940 and the loudspeaker 950 for reasons described above. The resulting ringing signals generated in the intercom 920 are transmitted via the electrically conductive wires, leads or conductors 938 to the loudspeaker 950' where audible ringing sounds are generated to alert the operator of the intercom 920'.

As soon as sound or voice transmission is to commence, subsequent to the ringing operation, the button of the switch 932 is depressed so that now both buttons 930 and 932 are depressed to thereby close the switch 930 and open the switch 932. The switch 932 is opened subsequent to the ringing operation for two primary reasons. Firstly, there is eliminated the reproduction of sounds of the operator at the intercom location through the speaker associated with that intercom. This is clearly not necessary and would normally not be detectable because the operator's voice would in most cases be substantially louder than the audible signals generated by the loudspeaker 950. Additionally, opening of the switch 932 during transmission of sound of voice prevents currents from being directed unnecessarily into the loudspeaker 950 to thereby avoid excessive battery drain. In this way, after the speaker 950 has served its acoustic feedback function for purposes of ringing, the speaker is disconnected from the circuit during transmission of sound or speech and the electrical signals generated in the intercom 920 are only converted or reproduced into audible sound or speech at the remote location through the parallel speaker 950'. In FIG. 36 there is shown a modified intercom 952 which has only one button corresponding to the switch 930 and does not have the second button corresponding to the switch 932. In such a modified intercom, the speakers 950 and 950' are always connected in the circuit. With such an arrangement, the speakers may be used to initiate ringing as described above. However, these speakers unnecessarily reproduce the sound or speech of the operator at his own location. In addition to resulting in an excessive battery drain, the above-described acoustic feedback between the tap transducer 940 and the speaker 950 may result in additional distortions of the sound or speech during transmission to the remote location.

As described above, the tap transducers exhibit optimum vibratory or switching characteristics when the axes of the conductive switching bars are in substantially vertical orientations. Referring to FIGS. 34 and 35, there is shown a still further modified embodiment of an intercom 954 which includes detection means for detecting when the axis of the switching bar of the tap transducer substantially deviates from the vertical direction.

The intercom 954 includes a rectangular enclosure 956 and a cover 958.

A speaker grill 928 is provided on the rectangular enclosure as with the previous embodiments. However, there is also provided on the rectangular enclosure 956 a perforated portion 960 formed with a plurality of holes, the perforated portion 960 generally facing the same direction as the speaker grill 928.

Referring to FIG. 35, the intercom 954 is shown to be provided with a recessed soundboard 962 positioned behind the perforated portion 960, the recessed soundboard forming part of a generally cup-shaped configuration having a generally cylindrical wall as shown provided with air holes 964 which permit movements of air therethrough with movements of the soundboard 962. Mounted on the soundboard 962 is a modified tap transducer 966 of the type generally described above. The cover 958 is similarly provided with holes 964' which facilitate the movement of air from the cut-shaped configuration through the air holes 964 when the cover 958 is mounted and securely connected to the rectangular enclosure 956.

The electrical circuit or schematic of the intercom 956 is generally similar to that described in connection with the intercom 920. Accordingly, the intercom 956 similarly includes batteries 948, a speaker 950, a normally open press-to-talk and ring momentary contact switch 930 and press-to-disable the speaker momentary contact switch 932. The switch 930 is normally open while the switch 932 is normally closed. Here, while the tap transducer 966 is positioned above the loudspeaker 950, as viewed in FIG. 35, instead of being positioned behind the spekaer 950 as was the case with the intercom 920, there is nevertheless accoustic coupling between the tap transducer 966 and the speaker 950. The cone of the speaker 950 produces air movements within the housing of the intercom 954, which air movements are transmitted through the air holes 964 to produce vibratory movements of the recessed soundboard 962. The acoustic feedback being present, the ringing mechanism is the same in all cases.

As mentioned above, the intercom 954 includes detection means for detecting when the orientation of the tap transducer 966 substantially deviates from its optimum condition. This, as described above, is when the conductive switching bar of the tap transducer 966 is substantially in a vertical direction. While numerous detection means will readily become evident to those skilled in the art, a presently preferred detection means comprises a series circuit which includes a transducer in the nature of a mercury switch 968 for detecting the orientation of the housing or rectangular enclosure 956 of the intercom 954 and, therefore, also the orientation of the conductive switching bar of the tap transducer 966. Indication means in the nature of a lamp 970 is connected in series with the mercury switch 968. The orientation detection circuit may be connected to the same batteries 948 used for ringing and for generation of electrical signals containing the sound or speech information or may use separate batteries. In accordance with one arrangement, the lamp 970 can be connected directly to the source of electrical energy or batteries 948 as soon as the mercury switch 968 closes upon excessive deviation of the intercom 954 permits optimum position. In the presently preferred embodiment, there is provided an additional normally open momentary contact switch 972 which is connected in series with the mercury switch 968 and the lamp 970 so that the orientation detection circuit is only enabled when the button of the switch 972 is momentarily depressed. Provision of the switch 972 avoids excessive battery drain and prevents the lamp 970 from being continuously lit when, for example, the intercom 954 is positioned in its non-optimum orientation and stored in that condition for a long period of time. In this way, the operators of the intercoms can periodically press the button 972 to confirm the optimum orientation of the intercom 954, particularly when the intercom is not operating satisfactorily and when it is believed that the faulty operation may at least in part be due to the non-optimum positioning of the intercom. Because the orientation of the tap transducer is important for transmission of electrical signals containing sound or speech information as well as for ringing at the remote location, the switch 972 may also be in the nature of a single pole double-throw switch which can be closed during use of the intercom and maintained in the closed condition during the entire period of use without the necessity of maintaining a temporary contact button depressed during such period of use. A double-throw switch placed in a closed condition would provide continuous monitoring of the orientation of the intercoms as well as provide continuous confirmation of the proper orientation thereof. Additionally, while a lamp 970 is used by way of an example as the indicating means of the detection circuit, it should be clear that any other indicator, including a bell or a buzzer, may be used for this purpose.

Although the present invention has been described in some detail by way of illustration and example for purposes of clarity of understanding, it is understood that certain changes and modifications may be made within the scope of the invention.

What is claimed is:

1. An intercom for transmitting electrical signals containing sound or speech information, the intercom comprising a housing at least a portion of which forms a soundboard sensitive to vibratory input; a pair of electrically conductive bearing means rigidly mounted on said soundboard and electrically insulated therefrom; a conductive switching bar extending between and loosely engaged in said bearing means, said switching bar being least mechanically stable or being in a state of least equilibrium when the axis thereof is in a substantially vertical orientation to provide optimum vibratory or switching characteristics; a source of electrical energy having one pole thereof connected to one of said bearing means; conversion means for converting the electrical signals into audible sound or speech, said conversion means having two input terminals one of which is connected to the other pole of said source of electrical energy and the other terminal of which is connected to the other of said bearing means, whereby said conductive switching bar, said source of electrical energy and said conversion means together form a series circuit; actuation means connected in said series circuit for selectively enabling and disabling the operation of said series circuit, a current flowing through said series circuit only in the enabled condition thereof, said current being converted into said electrical signals containing sound or speech information when said soundboard is exposed to sound or speech and said current is repeatedly interrupted to correspond to the vibratory characteristics of said sound or speech patterns due to the make and break conditions of said conductive switching bar with relation to said bearing means; output terminal means connected to said circuit for transmitting said electrical signals to a remote location; and detection means for detecting when the axis of said switching bar substantially deviates from the vertical direction, whereby said electrical signals appearing at said output terminal means may be used to reliably produce sound or speech at the location or the intercom or to transmit the same to a remote location.

2. An intercom as defined in claim 1, wherein said conversion means comprises a loudspeaker.

3. An intercom as defined in claim 1, wherein said source of electrical energy is a battery.

4. An intercom as defined in claim 1, wherein said actuation means comprises a normally open switch connected in said series circuit.

5. An intercom as defined in claim 4, wherein said switch is a single pole momentary contact switch.

6. An intercom as defined in claim 1, wherein said conductive switching bar has an axis, a sufficient clearance being provided between said conductive switching bar and said bearing means to permit movement of said conductive switching bar in directions transverse to the axis thereof to provide said make and break conditions which repeatedly interrupt said current.

7. Two intercoms as defined in claim 1 each of which has output terminal means; and further comprising electrical conductor means extending between said intercoms and connected to each of said output terminal means of the respective intercoms, whereby electrical signals generated in one of said intercoms are transmitted over said electrical conductor means to the other of said intercoms for conversion into audible sound or speech at said other of said intercoms.

8. An intercom as defined in claim 1, wherein said detection means comprises a series circuit including a transducer for detecting the orientation of said housing and said conductive switching bar, indication means, and means for applying a source of electrical energy to said indication means when said transducer detects excessive deviation of said axis of said conductive switching bar from the vertical orientation.

9. An intercom as defined in claim 8, wherein said transducer comprises a mercury switch.

10. An intercom as defined in claim 8, wherein said indication means comprises a lamp.

11. An intercom as defined in claim 8, further comprising a normally open momentary contact switch in series circuit with said indicating means for selectively enabling the operation of said detection means.

12. An intercom as defined in claim 1, wherein said conversion means is mounted on said proximate to said soundboard to acoustically couple said conversion means and said conductive switching bar, whereby said conversion means reinforces the mechanical vibrations of said soundboard when said current is applied to said conversion means and the resulting movements of said conductive switching bar produces a ringing which is intended to alert a user at a remote location of impending transmission of speech or sound signals.

13. An intercom as defined in claim 1, further comprising switching means connected in series with said conversion means for selectively disabling the same.

14. An intercom as defined in claim 13, wherein said switching means comprises a normally closed momentary contact switch.

15. An intercom as defined in claim 14, wherein said output terminal means is connected in parallel to the series arrangement of said conversion means and switching means, whereby electrical signals can be generated at said output terminal means for transmission to a remote location while preventing said electrical signals from being applied to said conversion means by opening said normally closed momentary contact switch.

* * * * *